(12) United States Patent
Saito et al.

(10) Patent No.: US 8,279,383 B2
(45) Date of Patent: Oct. 2, 2012

(54) FILM FOR OPTICAL USE, TRANSPARENT CONDUCTIVE MEMBER AND TRANSPARENT TOUCH PANEL USING THE SAME

(75) Inventors: Masato Saito, Saitama (JP); Masuo Koyama, Saitama (JP)

(73) Assignee: Kimoto Co., Ltd. (JP)

( * ) Notice: Subject to any disclaimer, the term of this patent is extended or adjusted under 35 U.S.C. 154(b) by 857 days.

(21) Appl. No.: 12/440,158

(22) PCT Filed: Sep. 21, 2007

(86) PCT No.: PCT/JP2007/068357
§ 371 (c)(1),
(2), (4) Date: Mar. 5, 2009

(87) PCT Pub. No.: WO2008/041506
PCT Pub. Date: Apr. 10, 2008

(65) Prior Publication Data
US 2009/0315844 A1    Dec. 24, 2009

(30) Foreign Application Priority Data
Sep. 29, 2006   (JP) ................. 2006-266277

(51) Int. Cl.
*G02F 1/1333*   (2006.01)

(52) U.S. Cl. .................................... 349/122

(58) Field of Classification Search ........... 349/122, 349/137
See application file for complete search history.

(56) References Cited

U.S. PATENT DOCUMENTS

| 7,170,684 B2* | 1/2007 | Fukuda et al. ....... 359/586 |
| 7,505,104 B2* | 3/2009 | Watanabe et al. ...... 349/137 |
| 2002/0018163 A1* | 2/2002 | Yamamoto et al. ..... 349/122 |
| 2003/0174257 A1 | 9/2003 | Harada et al. ........... 349/12 |
| 2006/0056030 A1 | 3/2006 | Fukuda et al. ......... 359/586 |

FOREIGN PATENT DOCUMENTS

| JP | 10-166531 | 6/1998 |
| JP | 2005-257840 | 9/2005 |

* cited by examiner

*Primary Examiner* — James Dudek
(74) *Attorney, Agent, or Firm* — Bacon and Thomas, PLLC

(57) ABSTRACT

The present invention provides a film for optical use wherein interference patterns are inconspicuous, while hard coat properties and image sharpness are maintained.
In the film for optical use, an undercoat layer 22 is disposed between a base material layer 21 and a resin layer 23 having hard coat properties. Refractive index na of the base material layer 21, refractive index nb of the undercoat layer 22 and refractive index nc of the resin layer 23 satisfy the relationship of na≦nb≦nc or na≧nb≧nc (provided that na≠nc). The difference between the refractive index na of the base material layer 21 and the refractive index nb of the resin layer 23 is 0.5 or smaller. Since the difference of refractive indexes of adjacent layers is low, interference unevenness can be suppressed and image sharpness can be maintained.

9 Claims, 1 Drawing Sheet

FILM FOR OPTICAL USE, TRANSPARENT CONDUCTIVE MEMBER AND TRANSPARENT TOUCH PANEL USING THE SAME

TECHNICAL FIELD

The present invention relates to a film for optical use in which interference pattern is suppressed while hard coat properties and image sharpness are maintained, a transparent conductive member and transparent touch panel using the same.

BACKGROUND ART

In recent years, liquid crystal displays attract attentions as image display devices. Liquid crystal displays are applied to portable electronic organizers, information terminals etc., and for example, they are used as input devices of portable electronic organizers, information terminals etc. When a liquid crystal display device is used as an input device, a structure that a transparent touch panel is placed on the liquid crystal display device is adopted. In particular, a resistance film type touch panel is generally used in view of price etc.

As the resistance film type touch panel, those having a structure that a transparent conductive film and glass having a transparent conductive film are disposed so that they are separated with an appropriate gap are generally used. When the transparent conductive film is pushed down with a finger or pen, it touches the glass having a transparent conductive film, and both are electrically connected. Pushing down of the film is thereby electrically detected.

As the transparent conductive film, a film comprising a base material film such as a plastic film and a transparent conductive film such as indium tin oxide (henceforth referred to as "ITO") formed on the lower surface of the base material film (surface facing glass having a transparent conductive film) is generally used. As the base material film, a transparent hard coat film formed by providing a transparent hard coat layer on a surface of a transparent polymer film is used. Use of a transparent hard coat film as the base material film of the transparent conductive film can improve durability of the transparent conductive film.

Under the environment where input devices such as portable electronic organizers and information terminals are used, three-band fluorescent lamps are frequently used as illumination. This is because three-band fluorescent lamps have characteristics that they show strong luminescence intensities for specific three kinds of wavelengths and can clearly visualize objects.

However, as described in Patent document 1, currently used transparent hard coat films incorporated into touch panels or the like may generate interference patterns due to uneven thickness of the transparent hard coat films, and have a problem that interference patterns becomes conspicuous especially in an environment where three-band fluorescent lamps are used for illumination. Although such interference patterns can be eliminated by using a transparent polymer film and a transparent hard coat film having the same refractive index as those constituting the transparent hard coated film, it is difficult to control the refractive index of the transparent hard coat film with maintaining the hard coat properties thereof. It is also possible to make interference patterns inconspicuous by making surface of the transparent hard coat film uneven by incorporating a matting agent into it. However, such incorporation of matting agent degrades sharpness of images observed through the transparent hard coat film (image sharpness). Patent document 1 discloses suppression of interference patterns by adjustment of hue and saturation of the transparent hard coat film.

Patent document 2 discloses a double-layer structure of an anti-reflection layer provided on a hard coat film for suppressing generation of interference patterns in the anti-reflection layer due to uneven thickness of the anti-reflection layer, wherein the anti-reflection layer consists of a high refractive index layer and low refractive index layer having refractive indexes in predetermined ranges.

Patent document 1: Japanese Patent Unexamined Publication (KOKAI) No. 2003-334891 (Background Art)
Patent document 2: Japanese Patent Unexamined Publication No. 2005-257840 (Background Art)

DISCLOSURE OF THE INVENTION

Object to be Achieved by the Invention

An object of the present invention is to provide a film for optical use wherein interference patterns are inconspicuous, while hard coat properties and image sharpness are maintained. Another object of the present invention is to provide a transparent conductive member using such a film for optical use as a base material. A further object of the present invention is to provide a touch panel using such a transparent conductive member.

Means for Achieving the Object

As a result of various researches of the inventors of the present invention, it was found that interference patterns could be made inconspicuous by making refractive indexes of layers constituting a film for optical use to be in a specific relation, and the above objects could be thereby achieved.

The film for optical use of the present invention is thus a film for optical use comprising a base material layer, and an undercoat layer and resin layer successively laminated on at least one surface of the base material layer, wherein refractive index na of the base material layer, refractive index nb of the undercoat layer and refractive index nc of the resin layer satisfy a relation of na≦nb≦nc or na≧nb≧nc (provided that na≠nc), and difference of the refractive index of the base material layer and the refractive index of the resin layer is 0.5 or smaller.

The film for optical use of the present invention may be characterized in that, for example, difference of refractive indexes of adjacent layers is 0.2 or smaller.

The film for optical use of the present invention may also be characterized in that, for example, wet tension of the undercoat layer is 40 mN/m or higher according to JIS K6768:1999.

The film for optical use of the present invention may also be characterized by, for example, haze of the film is 5% or less according to JIS K7105:1981.

The film for optical use of the present invention may also be characterized in that, for example, the resin layer is a hard coat layer.

The film for optical use of the present invention may also be characterized in that, for example, the refractive indexes of the base material layer, the undercoat layer and the resin layer are in the relation of na≧nb≧nc (provided that na≠nc), the refractive index of the base material layer is 1.45 or larger and 1.75 or smaller, the refractive index of the undercoat layer is 1.40 or larger and 1.70 or smaller, and the refractive index of the resin layer is 1.35 or larger and 1.65 or smaller.

The transparent conductive member of the present invention is characterized by comprising the aforementioned film for optical use and a transparent conductive film disposed on at least one surface of the film for optical use.

The transparent touch panel of the present invention is a transparent touch panel comprising two transparent electrode substrates each provided with a transparent conductive film on at least one surface thereof and disposed so that the transparent conductive films should face each other, and is characterized in that the aforementioned transparent conductive member is used as at least one of the transparent electrode substrates.

The transparent touch panel of the present invention may also be characterized in that one of the two transparent electrode substrates is a movable electrode substrate, the other is a fixed electrode substrate, and the aforementioned transparent conductive member is used as the movable electrode substrate.

Effect of the Invention

According to the present invention, by making refractive indexes of layers constituting a film for optical use to be in a specific relation, there can be provided a film for optical use and transparent conductive member using the film for optical use as a base material in which interference unevenness can be made inconspicuous while hard coat properties and image sharpness are maintained. Furthermore, a touch panel using that transparent conductive member can be provided.

BEST MODE FOR CARRYING OUT THE INVENTION

Embodiments of the film for optical use of the present invention will be explained.

As shown in FIG. 1, the film for optical use 2 of the present invention has a base material layer 21, an undercoat layer 22 disposed on at least one surface of the base material layer 21, and a resin layer 23 laminated on the undercoat layer 22. The resin layer 23 is a layer having hard coat properties. The refractive indexes of the three layers are designed so as to be in a predetermined relation. Specifically, they are designed so that the refractive index na of the base material layer 21, refractive index nb of the undercoat layer 22, and refractive index nc of the resin layer 23 should satisfy a relation of $na \leq nb \leq nc$ or $na \geq nb \geq nc$ (provided that $na \neq nc$), and difference of the refractive index of the base material layer 21 and the refractive index of the resin layer 23 should be 0.5 or smaller.

When the undercoat layer 22 is disposed between the base material layer 21 and the resin layer 23, and the refractive indexes of the base material layer 21, the undercoat layer 22 and the resin layer 23 satisfy the aforementioned relation as described above, differences of the refractive indexes of the three layers become small, and therefore interference resulting from uneven thickness of the resin layer 23 can be suppressed. Interference patterns and color unevenness caused by interference patterns (henceforth referred to as interference unevenness) can be thereby made inconspicuous. Even if the relation $na \leq nb \leq nc$ or $na \geq nb \geq nc$ is satisfied, if the difference of the refractive indexes of the base material layer 21 and the resin layer 23 becomes larger than 0.5, change of refractive index at the interfaces of the layers becomes large, and interference unevenness cannot be suppressed.

More preferably, as for the base material layer 21, the undercoat layer 22, and the resin layer 23, difference of refractive indexes of adjacent layers is desirably 0.2 or smaller. Such smaller difference of refractive indexes of adjacent layers is more advantageous for suppression of interference unevenness.

The refractive indexes of the layers are especially preferably designed so as to satisfy $na \geq nb \geq nc$. Specifically, the refractive index of the base material layer is preferably 1.45 or larger and 1.75 or smaller, the refractive index of the undercoat layer is preferably 1.40 or larger and 1.70 or smaller, and the refractive index of the resin layer is preferably 1.35 or larger and 1.65 or smaller.

The undercoat layer 22 preferably consists of a single layer in order to keep it from becoming a factor of reducing the hard coat properties of the resin layer 23, and the material and thickness thereof are appropriately chosen. By appropriately choosing the material and thickness of the undercoat layer 22, it also becomes possible to obtain an action of improving adhesion of the base material layer 21 and the resin layer 23.

In order to suppress interference unevenness, it is generally contemplated to form the resin layer 23 having hard coat properties with a fluororesin or the like to make the refractive indexes of the base material layer 21 and the resin layer 23 smaller. However, such means is not preferred, since it is likely to make the resin layer 23 brittle, and it also degrades adhesion with the base material layer 21. Further, since the refractive index of the base material layer 21 is generally larger than that of the resin layer 23, it is also contemplated to increase the refractive index of the resin layer 23 by mixing a substance of high refractive index such as metals, in order to make difference of the refractive indexes of the both smaller. However, such means is not preferred, since it invites degradation of hard coat properties. According to the present invention, interference unevenness is suppressed by disposing the undercoat layer 22 and appropriately determining differences of the refractive indexes of the three layers, without causing such problems as mentioned above.

The base material layer 21 of the film for optical use of the present invention may be a layer showing high transmissivity, and used is, for example, a polymer film showing superior transparency and consisting of one or more kinds of resins among polyester type resins, acrylic type resins, acrylic urethane type resins, polyester acrylate type resins, polyurethane acrylate type resins, epoxy acrylate type resins, urethane type resins, epoxy type resins, polycarbonate type resins, cellulose type resins, acetal type resins, vinyl type resins, polyethylene type resins, polystyrene type resins, polypropylene type resins, polyamide type resins, polyimide type resins, melamine type resins, phenol type resins, silicone type resins, fluorocarbon type resins and cyclic olefins. A biaxially stretched polyethylene terephthalate film is especially preferably used, since it shows superior mechanical strength and dimensional stability. Moreover, for use requiring heat resistance, polyethylene naphthalate showing superior heat resistance can be preferably used. Although thickness of the base material is not particularly limited so long as it is a thickness not causing any problem for handling, it is generally about 10 to 500 μm, preferably 12 to 350 μm.

It is sufficient that the undercoat layer 22 is formed on at least one surface of the base material layer 21, but it may be formed on both sides of the base material layer 21. The undercoat layer 22 is formed from, for example, a thermoplastic resin or a thermosetting resin. Thickness of the undercoat layer 22 is preferably about 0.03 to 1 μm. It is preferably 0.03 μm or larger for improving adhesion with the base material layer 21 or the resin layer 23, and it is preferably 1 μm or smaller for suppressing interference unevenness due to thickness unevenness of the undercoat layer 22, and for not degrading hard coat properties of the resin layer 23.

As the thermoplastic resin or thermosetting resin used for the undercoat layer 22, usable are one or more kinds of resins among polyester type resins, acrylic type resins, acrylic urethane type resins, polyester acrylate type resins, polyurethane acrylate type resins, epoxy acrylate type resins, urethane type resins, epoxy type resins, polycarbonate type resins, cellulose type resins, acetal type resins, polyethylene type resins, polystyrene type resins, polyamide type resins, polyimide type resins, melamine type resins, phenol type resins, silicone type resins, and so forth.

Moreover, the undercoat layer 22 preferably shows a wet tension of 40 mN/m or higher according to JIS K6768:1999. If the wet tension is 40 mN/m or higher, the resin layer 23 becomes a uniform and smooth coated film not showing unevenness, and therefore interference unevenness resulting from thickness unevenness of the resin layer 23 can be suppressed. Moreover, bad adhesion of the base material layer 21 and the resin layer 23 can also be suppressed. Furthermore, degradation of image sharpness due to reflection patterns can be prevented by prevention of interference unevenness. The wet tension of 40 mN/m or higher is not limited to that obtained as an inherent characteristic of the resin. The wet tension of 40 mN/m or higher may be obtained by increasing wet tension by subjecting the surface of the undercoat layer 22 to a corona discharge treatment or the like.

As the resin layer 23, resins including thermoplastic resins, thermosetting resins and ionizing radiation curable resins can be used. A layer formed from an ionizing radiation curable resin is especially preferred, since such a layer exhibits hard coat properties such as surface hardness. The resin layer 23 preferably shows a surface hardness of H or higher, more preferably 3 H or higher, as the film for optical use. The surface hardness of lower than H is not preferred because the layer becomes likely to be scratched.

When the film for optical use is applied to a use strictly requiring visibility and permeability, it is desirable not to add a pigment to the resin layer 23. This is because such addition may become a factor for degrading visibility and permeability, and also degrades appearance of the film such as gloss. For example, the film for optical use preferably shows a haze of 5% or lower, more preferably 3% or lower, according to JIS K7105:1981.

As the thermoplastic resins and thermosetting resins constituting the resin layer 23, the resins used for the aforementioned undercoat layer 22 can be used. As the ionizing radiation curable resins, photopolymerizable prepolymers which can be cured by crosslinking caused by irradiation of ionizing radiation (ultraviolet ray or electron beam) can be used. As such photopolymerizable prepolymers, acrylic type prepolymers which have two or more acryloyl groups in the molecule and form a three-dimensional reticular structure are especially preferably used. As such acrylic type prepolymers, urethane acrylates, polyester acrylates, epoxy acrylates, melamine acrylates, polyfluoroalkyl acrylates, silicone acrylates, and so forth can be used. Although these acrylic type prepolymers can be used alone, photopolymerizable monomers are preferably added in order to improve crosslinking curable property and further improve hardness as surface protective film.

Used as the photopolymerizable monomers are one or two or more kinds of monomers among monofunctional acrylic monomers such as 2-ethylhexyl acrylate, 2-hydroxyethyl acrylate, 2-hydroxypropyl acrylate and butoxyethyl acrylate, bifunctional acrylic monomers such as 1,6-hexanediol acrylate, neopentylglycol diacrylate, diethylene glycol diacrylate, polyethylene glycol diacrylate and hydroxypivalic acid ester neopentylglycol diacrylate, polyfunctional acrylic monomers such as dipentaerythritol hexaacrylate, trimethylpropane triacrylate and pentaerythritol triacrylate, and so forth.

When the ionizing radiation curable resins are cured by ultraviolet irradiation, it is preferred to use additives such as photopolymerization initiators and photopolymerization enhancers, besides the photopolymerizable prepolymers and photopolymerizable monomers mentioned above.

Examples of the photopolymerization initiators include acetophenone, benzophenone, Michler's ketone, benzoin, benzyl methyl ketal, benzoyl benzoate, α-acyl oxime ester, thioxanthones, and so forth.

The photopolymerization enhancers can accelerate the curing rate by reducing polymerization disturbance caused by oxygen in the air at the time of curing, and examples include p-dimethylaminobenzoic acid isoamyl ester, p-dimethylaminobenzoic acid ethyl ester, and so forth.

As for the resins constituting the layers of the undercoat layer 22 and the resin layer 23, it is preferable to choose those of which main component resins show solubility coefficients close to each other in order to improve adhesion between the layers. Those showing difference of solubility coefficients of 1 or smaller are particularly preferred. For example, when an ionizing radiation curable resin is used for the resin layer 23, resins are chosen so that difference of the solubility coefficient of the main oligomer component of the prepolymer constituting the ionizing radiation curable resin and the solubility coefficient of the monomer component constituting the main resin of the undercoat layer 22 should be 1 or smaller. Specifically, when the oligomer component of the ionizing radiation curable resin forming the resin layer 23 is urethane acrylate, solubility coefficient thereof is 10, and therefore the undercoat layer 22 can be formed from a saturated polyester resin showing a solubility coefficient different from the solubility coefficient of 10 by 1 or smaller.

Although thickness of the resin layer 23 changes depending on the resin to be used and so forth, it is preferably 0.5 to 15 μm, more preferably about 2 to 10 μm, so that the layer should exhibit hard coat property. Sufficient hard coat property can be obtained with a thickness of the resin layer 23 of 0.5 μm or larger. Moreover, with a thickness of 15 μm or smaller, generation of curl due to cure shrinkage of the resin layer can be prevented, and undercuring due to insufficient irradiation of ultraviolet radiation and degradation of adhesion with the undercoat layer can be prevented.

Moreover, an adhesive layer can also be provided on the surface of the base material layer 21 on the side opposite to the resin layer 23 side. Used as the material of the adhesive layer are, for example, known adhesives including elastomer adhesives of natural rubber type, reclaimed rubber type, polychloroprene rubber type, nitro rubber type, styrene-butadiene type and so forth, synthetic resin adhesives of acrylic type, polyester type, epoxy type, urethane type, cyanoacrylate type and so forth, as well as emulsion type adhesives and so forth. Since the adhesive layer usually has a thickness of 15 μm or larger so that the layer should exhibit adhesion, it hardly affects the interference unevenness.

As the method for forming the undercoat layer 22, resin layer 23 and adhesive layer explained above, usable is a method of preparing composition of the components of each layer and other components if needed, dissolving or dispersing them in a suitable solvent to prepare a coating solution or dispersion, applying the coating solution or dispersion by a known method such as roll coating method, bar coating method, spray coating method and air knife coating method, drying and curing it with an appropriate curing method.

Moreover, it is also possible to impart ultraviolet absorption property to the layers 21 to 23 and adhesive layer explained above. In particular, with a light transmission of about 0.1 to 70% for lights in the range of 350 to 380 nm, weather resistance can be imparted while maintaining the hard coat properties. When an ionizing radiation curable resin is used for the resin layer 23, ultraviolet ray absorbing property can be imparted without affecting curing of the resin layer 23 by adjusting the ultraviolet region in which the ionizing radiation curable resin is cured and the ultraviolet region of which lights are absorbed. For example, it is preferable to use a photopolymerization initiator showing a peak of absorption wavelength region at a position different from the peak of the absorption wavelength region of the ultraviolet absorber by 20 nm or more. By such adjustment as mentioned above, the resin layer 23 can fully be cured, and superior hard coat properties can be imparted.

Moreover, although this embodiment has been explained for a case where the resin layer 23 is formed on one side of the base material layer 21 as shown in FIG. 1, the resin layers 23 may be formed on both sides of the base material 21. In such a case, it is preferred that the undercoat layer 22 and the resin layer 23 are provided on one surface and the other surface of the base material 21 as the center layer, so that the conditions for refractive indexes na≦nb≦nc or na≧nb≧nc, and |na−nc|0.5) should be satisfied on the both sides. In this case, as for the conditions of na≦nb≦nc and na≧nb≧nc, the same conditions or different conditions may be satisfied on both sides of the base material 21. For example, na≦nb≦nc may be satisfied on one surface side of the base material 21, and na≧nb≧nc may be satisfied on the other surface side.

Hereafter, an embodiment of the transparent conductive member constituted by using the film for optical use mentioned above will be explained by referring to FIG. 2.

The transparent conductive member 4 shown in FIG. 2 is provided with a transparent conductive film 3 on at least one surface of the film 2 for optical use having the configuration described above. Here, the transparent conductive member in which the transparent conductive film 3 is provided on the surface of the film 2 for optical use on the side opposite to the resin layer 23 side will be explained as an example. However, the transparent conductive film 3 may also be formed on the resin layer 23.

As the material of the transparent conductive film 3, generally widely known transparent conductive materials can be used. For example, transparent conductive substances such as indium oxide, tin oxide, indium tin oxide, gold, silver and palladium can be used. Thin films of these can be formed on the surface of the film for optical use opposite to the surface of the resin layer side by vacuum deposition technique, sputtering method, ion-plating method, solution coating method, or the like. The transparent conductive film can also be formed by using an organic conductive material consisting of a conductive polymer such as polyparaphenylene, polyacethylene, polyaniline, polythiophene, poly(paraphenylene vinylene), polypyrrole, polyfuran, polyselenophene and polypyridine. In particular, a transparent conductive material using, as the main componentm indium oxide, tin oxide or indium tin oxide, which shows superior transparency and conductivity, and can be obtained at a relatively low cost, can be preferably used.

Although thickness of the transparent conductive film 3 changes depending on the material on which it is applied, and cannot be generally defined, it is desirably a thickness providing a surface resistance of 1000 Ω or lower, preferably 500 Ω or lower. For example, it is preferably 10 nm or larger, more preferably 20 nm or larger. From the economical view point, the thickness is 80 nm or smaller, preferably 70 nm or smaller. A film having such a thickness is unlikely to generate interference patterns of visible lights due to unevenness of thickness of the transparent conductive film 3. Total light transmission is usually preferably 80% or more, more preferably 85% or more, particularly preferably 88% or more.

Since the transparent conductive member 4 having such a configuration does not generate conspicuous interference unevenness, it can be used as an antistatic film, an infrared shielding film, an anti-reflection film, a member for transparent electrode or the like.

An embodiment of the transparent touch panel 1 of the present invention will be explained below with reference to FIG. 2. The transparent touch panel 1 of the present invention has a configuration that two transparent electrode substrates each provided with a transparent conductive film on at least one surface thereof are disposed so that the transparent conductive films should face each other, and one of the two transparent electrode substrates is a movable electrode substrate. The transparent conductive member 4 of the present invention is used as the movable transparent electrode substrate.

More specifically, as shown in FIG. 2, the transparent conductive film 7 is formed on the glass substrate 6, which is the transparent electrode substrate of the non-movable electrode side, and dot-like spacers 5 are disposed on it. The transparent conductive member 4 of the embodiment mentioned above are disposed opposing to the glass substrate 6 so that the transparent conductive film 3 should face the spacers 5. Electrodes not shown in the drawing are disposed on the ends of the transparent conductive member 4 and the glass substrate 6. The resistant film type transparent touch panel 1 is constituted as described above.

In such a transparent touch panel 1 as described above, when the transparent conductive member 4 is pushed down by a user with a pen, finger or the like, the transparent conductive film 3 contacts with the transparent conductive film 7 on the glass substrate 6. By electrically detecting this contact via the electrodes at the ends, the pushed position is detected.

Since the transparent touch panel 1 uses the transparent conductive member 4 as the movable electrode, interference unevenness can be suppressed. In addition, since the film 2 for optical use of the present invention has superior hard coat properties and shows superior image sharpness, it provides effects that the transparent touch panel 1 is unlikely to suffer from scratches, and display on a liquid crystal display panel disposed under the touch panel 1 is legible. The spacers 5 may be disposed if needed, and the touch panel may have a configuration that no spacer 5 is disposed.

In addition, instead of the non-movable electrode (the glass substrate 6 and the transparent conductive film 7), the transparent conductive member 4 of the present invention can also be used. The touch panel can be thereby made lighter, thinner and harder to break.

EXAMPLES

Hereafter, the present invention will be further explained with reference to examples. The term and symbol "part" and "%" are used on weight basis, unless especially indicated.

Example 1

As the base material layer 21, a transparent polymer film (polyethylene terephthalate, refractive index: 1.65) having a thickness of 188 μm was used. On one surface of the base material layer 21, a coating solution for undercoat layer having the following composition was applied by bar coating, and cured by heating to form the undercoat layer 22 made of polyester type resin and having a thickness of about 0.2 μm and a refractive index of 1.60. Further, on the undercoat layer 21, a coating solution for resin layer having the following composition was applied by bar coating, dried and cured by ultraviolet irradiation performed with a high pressure mercury vapor lamp to form the resin layer 23 made of ionizing radiation curable resin and having a thickness of about 10 μm and a refractive index of 1.50 and thereby obtain a film for optical use of Example 1.

<Coating Solution for Undercoat Layer, Refractive Index: 1.60>

| | part |
|---|---|
| Polyester type resin (Elitel UE3200, Unitika, Ltd.) | 1 part |
| Dilution solvent | 32 parts |

<Coating Solution for Resin Layer, Refractive Index: 1.50>

| | |
|---|---|
| Ionizing radiation curable resin (Beamset 575, Arakawa Chemical Industries, Ltd.) | 10 parts |
| Photopolymerization initiator (Irgacure 184, Ciba Specialty Chemicals Inc.) | 0.5 part |
| Dilution solvent | 10 parts |

Example 2

As the base material layer 21, a polyethylene naphthalate film having a refractive index of 1.75 was used. Except for the above, a film for optical use of Example 2 was obtained in the same manner as that of Example 1.

Example 3

As the base material layer 21, the same polyethylene naphthalate film having a refractive index of 1.75 as that of Example 2 was used. The undercoat layer 22 made of acrylic resin and having a thickness of about 0.2 μm and a refractive index of 1.50 and the resin layer 23 made of polyvinyl acetate and having a thickness of about 10 μm and a refractive index of 1.45 were formed in the same manner as that of Example 1 by using the following coating solution for undercoat layer and coating solution for resin layer, provided that ultraviolet irradiation was not performed at the time of the formation of the resin layer 23, and thereby a film for optical use of Example 3 was obtained.

<Coating Solution for Undercoat Layer, Refractive Index: 1.50>

| | |
|---|---|
| Acrylic type resin (Jurymer FC-60, Nihon Junyaku Co., Ltd.) | 1 part |
| Dilution solvent | 7 parts |

<Coating Solution for Resin Layer, Refractive Index: 1.45>

| | |
|---|---|
| Polyvinyl acetate (Gohsenol GL-05, Nippon Synthetic Chemical Industry Co., Ltd.) | 10 parts |
| Dilution solvent | 10 parts |

Example 4

As the base material layer 21, the same polyethylene terephthalate film having a refractive index of 1.65 as that of Example 1 was used. As the coating solution for undercoat layer, the following solution was used. As the coating solution for resin layer, the same solution as that of Example 1 was used. The undercoat layer 22 made of polystyrene type resin and having a thickness of about 0.2 μm and a refractive index of 1.60 and the resin layer 23 made of ionizing radiation curable resin and having a thickness of about 10 μm and a refractive index of 1.50 were formed in the same manner as that of Example 1, and thereby a film for optical use of Example 4 was obtained.

<Coating Solution for Undercoat Layer, Refractive Index: 1.60>

| | |
|---|---|
| Polystyrene type resin (HI Styron 470, Asahi Kasei Chemicals Corporation) | 1 part |
| Dilution solvent | 32 parts |

Example 5

As the base material layer 21, the same polyethylene terephthalate film having a refractive index of 1.65 as that of Example 1 was used. As the coating solution for undercoat layer, the following solution was used. As the coating solution for resin layer, the same solution as that of Example 1 was used. The undercoat layer 22 made of vinylidene chloride resin and having a thickness of about 0.2 μm and a refractive index of 1.60 and the resin layer 23 made of ionizing radiation curable resin and having a thickness of about 10 μm and a refractive index of 1.50 were formed in the same manner as that of Example 1, and thereby a film for optical use of Example 5 was obtained.

<Coating Solution for Undercoat Layer, Refractive Index: 1.60>

| | |
|---|---|
| Vinylidene chloride resin (Saran Latex L-504, Asahi Kasei Chemicals Corporation) | 2 parts |
| Dilution solvent | 31 parts |

Example 6

As the base material layer 21, a polypropylene film having a refractive index of 1.49 was used. As the coating solution for undercoat layer, the same solution as that of Example 3 was used. As the coating solution for resin layer, the following solution was used. The undercoat layer 22 made of acrylic resin and having a thickness of about 0.2 μm and a refractive index of 1.50 and the resin layer 23 made of polyester type resin and having a thickness of about 10 μm and a refractive index of 1.60 were formed in the same manner as that of Example 1 provided that ultraviolet irradiation was not performed at the time of the formation of the resin layer 23, and thereby a film for optical use of Example 6 was obtained.

<Coating Solution for Resin Layer, Refractive Index: 1.60>

| | |
|---|---|
| Polyester type resin (Elitel UE3200, Unitika, Ltd.) | 10 parts |
| Dilution solvent | 10 parts |

Example 7

As the base material layer 21, the same polyethylene naphthalate film having a refractive index of 1.75 as that of Example 2 was used. As the coating solution for undercoat layer, the same solution as that of Example 1 was used. As the coating solution for resin layer, the same solution as that of Example 3 was used. The undercoat layer 22 made of polyester resin and having a thickness of about 0.2 μm and a refractive index of 1.60 and the resin layer 23 made of polyvinyl acetate and having a thickness of about 10 μm and a refractive index of 1.45 were formed in the same manner as that of Example 1 provided that ultraviolet irradiation was not performed at the time of the formation of the resin layer 23, and thereby a film for optical use of Example 7 was obtained.

Example 8

As the base material layer 21, the same polyethylene naphthalate film having a refractive index of 1.75 as that of Example 2 was used. As the coating solution for undercoat layer, the same solution as that of Example 1 was used. As the coating solution for resin layer, the following solution was used. The undercoat layer 22 made of polyester resin and having a thickness of about 0.2 μm and a refractive index of 1.60 and the resin layer 23 made of fluorocarbon resin and having a thickness of about 10 μm and a refractive index of 1.35 were formed in the same manner as that of Example 1, and thereby a film for optical use of Example 8 was obtained. In Example 8, after the undercoat layer 22 was formed, the surface of the undercoat layer 22 was subjected to a corona discharge treatment, and the resin layer 23 was formed on that surface. Adhesion of the undercoat layer and the resin layer 23 was thereby improved. Further, ultraviolet irradiation was not performed at the time of the formation of the resin layer 23.

<Coating Solution for Resin Layer, Refractive Index: 1.35>

| | |
|---|---|
| Fluorine type resin (Cytop CTX-107AP, Asahi Glass Co., Ltd.) | 10 parts |
| Dilution solvent | Not used |

Example 9

A film for optical use of Example 9 having the same layer structure as that of Example 4 was obtained in the same manner as that of Example 1 by using the same base material layer 21, coating solution for undercoat layer and coating solution for resin layer as those of Example 4. In Example 9, however, after the undercoat layer 22 was formed, the surface of the undercoat layer 22 was subjected to a corona discharge treatment, and the resin layer 23 was formed on that surface. Adhesion of the undercoat layer and the resin layer 23 was thereby improved. Further, ultraviolet irradiation was not performed at the time of the formation of the resin layer 23.

Example 10

The same base material film, coating solution for undercoat layer and coating solution for resin layer as those of Example 3 were used. However, 0.3 part of silica beads having a particle diameter of 1 μm was added to the coating solution for resin layer. The base material layer 21 made of polyethylene naphthalate film and having a refractive index of 1.75, the undercoat layer 22 made of acrylic resin and having a thickness of about 0.2 μm and a refractive index of 1.50 and the resin layer 23 made of polyvinyl acetate (added with silica beads having a particle diameter of 1 μm) and having a thickness of about 10 μm and a refractive index of 1.45 were formed in the same manner as that of Example 3, and thereby a film for optical use of Example 10 was obtained.

Although the film for optical use of Example 10 contained the silica beads in the resin layer 23, the particle diameter (1 μm) was sufficiently small relative to the film thickness (10 μm) of the resin layer 23, therefore the surface of the resin layer 23 had no unevenness, and external haze was not generated. Only internal haze was generated by the silica beads.

Comparative Example 1

As the base material layer 21, the same polyethylene terephthalate film having a refractive index of 1.65 as that of Example 1 was used. As the coating solution for undercoat layer, the following solution was used. As the coating solution for resin layer, the same solution as that of Example 1 was used. The undercoat layer 22 made of polyvinyl acetate and having a thickness of about 0.2 μm and a refractive index of 1.45 and the resin layer 23 made of ionizing radiation curable resin and having a thickness of about 10 μm and a refractive index of 1.50 were formed in the same manner as that of Example 1, and thereby a film for optical use of Comparative Example 1 was obtained.

<Coating Solution for Undercoat Layer, Refractive Index: 1.45>

| | |
|---|---|
| Polyvinyl acetate (Gohsenol GL-05, Nippon Synthetic Chemical Industry Co., Ltd.) | 1 part |
| Dilution solvent | 32 parts |

Comparative Example 2

As the base material layer 21, a metal fine particle-containing film having a refractive index 2.0 was used. As the coating solution for undercoat layer and the coating solution for resin layer, the same solutions as those of Comparative Example 1 were used. The undercoat layer 22 made of polyvinyl acetate and having a thickness of about 0.2 μm and a refractive index of 1.45 and the resin layer 23 made of ionizing radiation curable resin and having a thickness of about 10 μm and a refractive index of 1.50 were formed in the same manner as that of Example 1, and thereby a film for optical use of Comparative Example 2 was obtained.

Comparative Example 3

As the base material layer 21, the same polyethylene terephthalate film having a refractive index of 1.65 as that of Example 1 was used. As the coating solution for undercoat layer and the coating solution for resin layer, the same solutions as those of Comparative Example 1 were used, provided that 10 parts of silica beads having a particle diameter of 5 µm were added to the coating solution for resin layer. The undercoat layer 22 made of polyvinyl acetate and having a thickness of about 0.2 µm and a refractive index of 1.45 and the resin layer 23 made of ionizing radiation curable resin and having a thickness of about 10 µm and a refractive index of 1.50 (added with silica beads having a particle diameter of 5 µm) were formed in the same manner as that of Example 1, and thereby a film for optical use of Comparative Example 3 was obtained.

Since the film for optical use of Comparative Example 3 contained the silica beads having a large particle diameter (5 µm) relative to the film thickness of the resin layer 23 (10 µm), unevenness was formed on the surface of the resin layer 23, and thus external haze was generated.

Comparative Example 4

A film for optical use of Comparative Example 4 having the same layer structure as that of Comparative Example 3 was obtained in the same manner as that of Example 1 by using the same base material layer 21, coating solution for undercoat layer and coating solution for resin layer as those of Comparative Example 3. However, as the silica beads added to the coating solution for resin layer, those having a particle diameter of 1 µm were used and added in an amount of 0.3 part.

Since the particle diameter of the silica beads contained in the film for optical use of Comparative Example 4 was small (1 µm) relative to the film thickness of the resin layer 23 (10 µm), unlike Comparative Example 3, the surface of the resin layer 23 had no unevenness, and external haze was not generated. Only internal haze was generated by the silica beads.

Comparative Example 5

As the base material layer 21, the same one as that of Comparative Example 2 was used. As the coating solution for undercoat layer and the coating solution for resin layer, the same solutions as those of Example 3 were used. The undercoat layer 22 made of acrylic type resin and having a thickness of about 0.2 µm and a refractive index of 1.50 and the resin layer 23 made of polyvinyl acetate and having a thickness of about 10 µm and a refractive index of 1.45 were formed on the base material layer 21 consisting of the metal fine particle-containing film having a refractive index of 2.0 in the same manner as that of Example 1, provided that ultraviolet irradiation was not performed at the time of the formation of the resin layer 23, and thereby a film for optical use of Comparative Example 5 was obtained.

Comparative Example 6

As the base material layer 21 and the coating solution for undercoat layer, the same ones as those of Comparative Example 2 were used. As the coating solution for resin layer, the same solution as that of Example 8 was used. The undercoat layer 22 made of polyvinyl acetate and having a thickness of about 0.2 µm and a refractive index of 1.45 and the resin layer 23 made of fluorocarbon resin and having a thickness of about 10 µm and a refractive index of 1.35 were formed on the base material layer 21 consisting of the metal fine particle-containing film having a refractive index of 2.0 in the same manner as that of Example 1, provided that ultraviolet irradiation was not performed at the time of the formation of the resin layer 23, and thereby a film for optical use of Comparative Example 6 was obtained.

Values of the refractive index na of the base material layer 21, the refractive index nb of the undercoat layer 22 and the refractive index nc of the resin layer 23 as well as relations of the values of the refractive indexes of the layers (> or <) of the films for optical use obtained in Examples 1 to 10 and Comparative Examples 1 to 6 mentioned above are shown in Table 1. Further, difference of the refractive indexes of the base material layer 21 and the resin layer 23 (|na−nc|), difference of the refractive indexes of the base material layer 21 and the adjacent undercoat layer 22 (|na−nb|), and the difference of the refractive indexes of the undercoat layer 22 and the adjacent resin layer 23 (|nb−nc|) are also shown in Table 1.

[Wet Tension]

Then, wet tension of the undercoat layers of the films for optical use obtained in Examples 1 to 10 and Comparative Examples 1 to 6 was measured according to JIS K6768:1999. As a test mixture, one showing a wet tension of 40.0 mN/m was used. Values of wet tension of 40.0 mN/m or larger are indicated as "40≦", and value lower than 40.0 mN/m is indicated as "<40" in Table 1.

[Solubility Coefficient]

Solubility coefficients of the main components of the undercoat layer 22 and the resin layer 23 used in Examples 1 to 10 and Comparative Examples 1 to 6 were calculated. Difference of them of 1 or smaller is shown as "≦1", and the difference larger than 1 is shown as "1<" in Table 1. The solubility coefficient is that according to the atomic group additive method advocated by van Kreevelen, and specifically, it was calculated according to the method described in Polymer Handbook, Fourth Edition, John Wiley & Sons, Inc., 1999, pages VII/675 to VII/686.

[Interference Unevenness]

On a black cloth, illumination light was irradiated on the resin layers of the films for optical use obtained in Examples 1 to 10 and Comparative Examples 1 to 6 with a three-band lamp, and interference unevenness generated in the reflected light was visually observed from a position where image of the three-band lamp produced by the reflected light was observed. Evaluation results are indicated with "⊚" when interference unevenness was completely inconspicuous, with "○" when interference unevenness was inconspicuous, with "Δ" when interference unevenness was present, but inconspicuous, or with "X" when interference unevenness was very conspicuous. When two or more samples of the same example were produced, and the samples showed different results indicated with ⊚ and ○, evaluation result is indicated as "⊚~○". Similarly, when samples showed different evaluation results indicated with ○ and Δ, evaluation result for that example is shown as "○~Δ". The evaluation results are shown in Table 2.

[Adhesion]

The resin layers of the films for optical use obtained in Examples 1 to 10 and Comparative Examples 1 to 6 were cut so that 100 grids should be formed with intervals of 1 mm according to the grid-tape method defined in JIS K5400, a cellophane adhesive tape defined in JIS-Z1522 was adhered and peeled, and then the state of the coated layers was observed by visual inspection. The evaluation results are indicated with "○" when no delamination occurred at all, with "Δ" when slight delamination occurred, or with "X" when complete delamination was observed. The results are shown in Table 2.

[Image Sharpness]

Image clarity of optical comb of 2.0 mm was measured through the films for optical use obtained in Examples 1 to 10 and Comparative Examples 1 to 6 using an image clarity meter (ICM-1DP, Suga Test Instruments Co., Ltd.) according to JIS K7105. The results are indicated with "○" when the measured value was 90% or higher, with "Δ" when the measured value was 80% or higher but lower than 90%, or with "X" when the measured value was lower than 80%. The measurement was performed with incident light from the surface having the resin layer. The results are shown in Table 2.

[Haze]

Haze (unit is "%") of the films for optical use obtained in Examples 1 to 10 and Comparative Examples 1 to 6 was measured by using SM Color Computer UGV-5K (Suga Test Instruments Co., Ltd.) according to JIS K7105:1981. The measurement was performed with incident light from the surface having the resin layer. The measurement results are indicated with "○" when haze was 5% or lower, or with "x" when haze exceeded 5%.

coat layer 22, and the refractive index nc of the resin layer 23 satisfied the relation na≦nb≦nc or na≧nb≧nc. On the other hand, in the films for optical use of Comparative Examples 1 to 4, neither the relation of na≦nb≦nc nor na≧nb≧nc was satisfied. As shown in Table 2, the evaluation results of the films for optical use of Examples 1 to 10 for interference unevenness were represented by any of the symbols of Δ to ⊚, whereas interference unevenness was conspicuous in the films of Comparative Examples 1, 3 and 4, and the evaluation results were indicated with X for all of these films. On the basis of these results, it could be confirmed that interference unevenness could be reduced by satisfaction of the relation of na≦nb≦nc or na≧nb≧nc.

Although the relation of na≦nb≦nc or na≧nb≧nc was not satisfied in the film of Comparative Example 3, the evaluation result thereof for interference unevenness is indicated with

TABLE 1

| | Na | | nb | | Nc | \|na − nc\| | \|na − nb\| | \|nb − nc\| | Wet tension (mN/m) | Difference of solubility coefficient | Note |
|---|---|---|---|---|---|---|---|---|---|---|---|
| Example 1 | 1.65 | > | 1.60 | > | 1.50 | 0.15 | 0.05 | 0.10 | 40≦ | ≦1 | |
| Example 2 | 1.75 | > | 1.60 | > | 1.50 | 0.25 | 0.15 | 0.10 | 40≦ | ≦1 | |
| Example 3 | 1.75 | > | 1.50 | > | 1.45 | 0.30 | 0.25 | 0.05 | 40≦ | ≦1 | |
| Example 4 | 1.65 | > | 1.60 | > | 1.50 | 0.15 | 0.05 | 0.10 | <40 | ≦1 | |
| Example 5 | 1.65 | > | 1.60 | > | 1.50 | 0.15 | 0.05 | 0.10 | 40≦ | 1< | |
| Example 6 | 1.49 | < | 1.50 | < | 1.60 | 0.11 | 0.01 | 0.10 | 40≦ | ≦1 | |
| Example 7 | 1.75 | > | 1.60 | > | 1.45 | 0.30 | 0.15 | 0.15 | 40≦ | ≦1 | |
| Example 8 | 1.75 | > | 1.60 | > | 1.35 | 0.40 | 0.15 | 0.25 | 40≦ | ≦1 | Corona discharge treatment |
| Example 9 | 1.65 | > | 1.60 | > | 1.50 | 0.15 | 0.05 | 0.10 | 40≦ | ≦1 | Corona discharge treatment |
| Example 10 | 1.75 | > | 1.50 | > | 1.45 | 0.30 | 0.25 | 0.05 | 40≦ | ≦1 | Beads (1 μm) |
| Comparative Example 1 | 1.65 | > | 1.45 | < | 1.50 | 0.15 | 0.20 | 0.05 | 40≦ | ≦1 | |
| Comparative Example 2 | 2.0 | > | 1.45 | < | 1.50 | 0.50 | 0.55 | 0.05 | 40≦ | ≦1 | |
| Comparative Example 3 | 1.65 | > | 1.45 | < | 1.50 | 0.15 | 0.20 | 0.05 | 40≦ | ≦1 | Beads (5 μm) |
| Comparative Example 4 | 1.65 | > | 1.45 | < | 1.50 | 0.15 | 0.20 | 0.05 | 40≦ | ≦1 | Beads (1 μm) |
| Comparative Example 5 | 2.0 | > | 1.50 | > | 1.45 | 0.55 | 0.50 | 0.05 | 40≦ | ≦1 | |

TABLE 2

| | Interference unevenness | Adhesion | Image sharpness | Haze |
|---|---|---|---|---|
| Example 1 | ⊚ | ○ | ○ | ○ |
| Example 2 | ⊚~○ | ○ | ○ | ○ |
| Example 3 | ○ | ○ | ○ | ○ |
| Example 4 | ○ | ○ | ○ | ○ |
| Example 5 | ⊚ | Δ | ○ | ○ |
| Example 6 | ⊚ | ○ | ○ | ○ |
| Example 7 | ○ | ○ | ○ | ○ |
| Example 8 | ○~Δ | ○ | ○ | ○ |
| Example 9 | ⊚~○ | ○ | ○ | ○ |
| Example 10 | ○ | ○ | Δ | X |
| Comparative Example 1 | X | ○ | ○ | ○ |
| Comparative Example 2 | X | ○ | ○ | ○ |
| Comparative Example 3 | ○ | ○ | X | X |
| Comparative Example 4 | X | ○ | Δ | X |
| Comparative Example 5 | X | ○ | ○ | ○ |
| Comparative Example 6 | X | ○ | ○ | ○ |

As seen from the values shown in Table 1, in the films for optical use of Examples 1 to 10, the refractive index na of the base material layer 21, the refractive index nb of the under- ○. This is because the surface of the film for optical use of Comparative Example 3 had unevenness due to addition of beads having a large particle diameter to the resin layer 23, and thereby external haze was generated to make interference unevenness inconspicuous. However, as seen from the result shown in Table 2, the external haze reduced the image sharpness of the film for optical use of Comparative Example 3, and the evaluation thereof is indicated with X (refer to Table 2). On the basis of these results, it can be confirmed that satisfaction of the relation of na≦nb≦nc or na≧nb≧nc is effective for suppressing interference unevenness with maintaining image sharpness. That is, although the action of making interference unevenness inconspicuous can be obtained by external haze, image sharpness cannot be maintained in the presence of external haze.

Further, in the film for optical use of Comparative Example 4, beads having a small particle diameter were added to the resin layer 23, and internal haze was generated. As seen from the result shown in Table 2, evaluation thereof for interference unevenness is indicated with X. On the basis of this result, it can also seen that interference unevenness cannot be suppressed with internal haze.

In comparison of refractive indexes of the films for optical use of Comparative Examples 5 and 6 and the refractive indexes of the films for optical use of Examples 1 to 10, it can be seen that although the films for optical use of Comparative Examples 5 and 6 satisfied the relation of na≦nb≦nc or na≧nb≧nc, interference unevenness was not suppressed in them, as shown in Tables 1 and 2. This is because the difference of the refractive index na of the base material layer 21 and the refractive index nc of the resin layer (|na−nc|) was larger than 0.5. The differences of refractive indexes of the adjacent layers thus became large, and interference unevenness was likely to be generated, although the relation of na≦nb≦nc or na≧nb≧nc was satisfied. On the basis of these results, it could be confirmed that it was necessary not only to satisfy the relation of na≦nb≦nc or na≧nb≧nc, but also to make the difference of the refractive index na of the base material layer 21 and the refractive index nc of the resin layer 0.5 or smaller.

Further, the films for optical use of Examples 3, 8, and 10 showed inferior evaluation results for interference unevenness compared with the films for optical use of Examples 1, 2, 5, 6 and 9. This is because the difference of the refractive indexes of the adjacent base material layer 21 and undercoat layer 22 |na−nb| in the film for optical use of Examples 3 and 10 was larger compared with those used in the other examples, the difference of the refractive indexes of the undercoat layer 22 and the resin layer 23 |nb−nc| in the film for optical use of Example 8 was larger compared with those used in the other examples, and they all exceeded 0.2. On the basis of these results, it can be seen that, in order to further suppress interference unevenness, it is desirable to design the difference of refractive indexes of adjacent layers to be 0.2 or smaller.

The film for optical use of Example 4 showed inferior evaluation result for interference unevenness compared with the films for optical use of Examples 1, 2, 5, 6 and 9. This is because the wet tension of the undercoat layer 22 was smaller than 40 mN/m, and therefore uniformity of the thickness of the resin layer 23 as the coated film at the time of the formation thereof was inferior to that observed in the other examples in which the wet tension was 40 mN/m or larger. On the basis of these results, it can be seen that it is desirable to design the wet tension of the undercoat layer 22 to be 40 mN/m or larger. Evenness of the resin layer can be thereby increased, and therefore interference unevenness can be further suppressed.

The wet tension of 40 mN/m or higher is not limited to that obtained as an inherent characteristic of the resin constituting the undercoat layer 22. The wet tension may be obtained by increasing it by corona discharge treatment or the like as in Examples 8 and 9. With a wet tension of 40 mN/m or higher, evenness of the resin layer can be increased. This can be confirmed from superior evaluation results of the films of Examples 8 and 9 for interference unevenness. In particular, the film of Example 9 had the same layer structure as that used in Example 4, and difference between them is only that the wet tension of the undercoat layer 22 was increased to 40 mN/m or higher by the corona discharge treatment. Therefore, it can be seen that the superior evaluation result of the film of Example 9 for interference unevenness compared with that obtained in Example 4 is due to the increase of the wet tension of the undercoat layer.

Further, in the film for optical use of Example 5, difference of the solubility coefficients of the resins as the main components constituting the undercoat layer 22 and the resin layer 23 exceeds 1 as shown in Table 1. Therefore, as seen from the results shown in Table 2, the film for optical use of Example 5 showed inferior adhesion of the layers compared with that observed in Examples 1 to 4 and 6 to 10 where the aforementioned difference of the solubility coefficients is 1 or smaller. On the basis of these results, it can be seen that the resins constituting the undercoat layer 22 and the resin layer 23 of the film for optical use are desirably chosen so that difference of solubility coefficients of resins as the main components should be 1 or smaller. The adhesion between the layers can be thereby increased.

Further, as seen from the results shown in Table 2, the film for optical use of Example 10 showing a haze higher than 5% in which beads were added to the resin layer 23 showed inferior image sharpness compared with the films for optical use of Examples 1 to 9 showing a haze of 5% or lower. On the basis of these results, it can be seen that the film for optical use of the present invention desirably has a lower haze, even if the haze is internal haze, and specifically, it is desirable to make the haze 5% or lower.

Example 11

Then, as Example 11, touch panels 1 of the configuration shown in FIG. 2 were produced by using the films for optical use of Examples 1 to 6 mentioned above. Touch panels of comparative examples were similarly produced by using the films for optical use of Comparative Examples 1 to 3 and 6.
Production of Transparent Conductive Members On the surface of the side opposite to the resin layer 23 in each of the films for optical use of Examples 1 to 6 and Comparative Examples 1 to 3 and 6 mentioned above, an ITO film having a thickness of about 20 nm was formed as the transparent conductive film 3 by the sputtering method to produce transparent conductive members 4 corresponding to Examples 1 to 6 and Comparative Examples 1 to 3 and 6.
Production of Lower Electrode Panels As the glass substrate 6, which was a transparent electrode substrate, a tempered glass plate having a thickness of 1 mm was prepared, an ITO film having a thickness of about 20 nm was formed as the transparent conductive film 7 on one surface of the substrate by the sputtering method, and the substrate was cut into a 4-inch size (rectangle having a length of 87.3 mm and a width of 64.0 mm) to produce a lower electrode panel.
Production of Spacers On the surface of the aforementioned lower electrode panel having the transparent conductive film 7, dots were printed with an ionizing radiation curable resin (Dot Cure TR5903, Taiyo Ink Mfg. Co., Ltd.) as a coating solution for spacer by screen printing, and ultraviolet irradiation was performed with a high pressure mercury vapor lamp to dispose spacers 5 having a diameter of 50 μm and a height of 8 μm with intervals of 1 mm.
Production of Transparent Touch Panels The aforementioned transparent conductive member 4 and lower electrode panel were disposed so that the transparent conductive film 3 and the transparent conductive film 7 should face each other, and the edges were fixed with a double-sided adhesive tape having a thickness of 30 μm and a width of 3 mm to prepare a transparent touch panel. In the above production, the fixed portions was made to be out of the display region of the transparent touch panel.

The touch panels produced by using the films for optical use of Examples 1, 2, 5 and 6 did not show conspicuous interference unevenness, and could be favorably operated. Interference unevenness was seen in the touch panels using the films for optical use of Examples 3 and 4, but it was not conspicuous, and they could be favorably operated.

The touch panels corresponding to Comparative Examples 1, 2 and 6 showed conspicuous interference unevenness, and they were hard to be operated.

The touch panel of Comparative Example 3 contained glass beads in the resin layer and thus had surface unevenness, and therefore it glared and was hard to be operated.

Description of Notations

Figure 1:
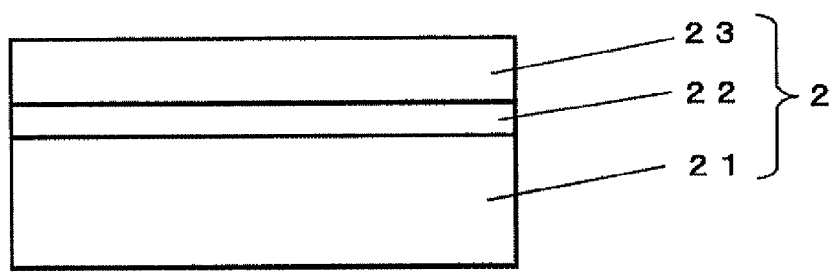
[FIG. 1] A sectional view showing an embodiment of the film for optical use of the present invention.
Figure 2:
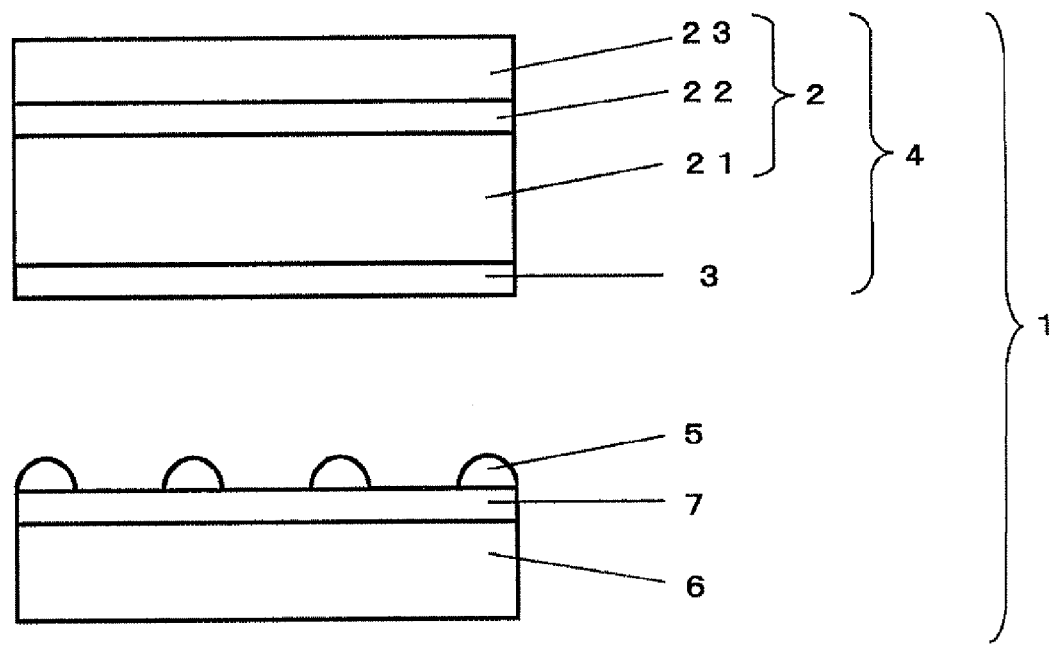
[FIG. 2] A sectional view showing an embodiment of the transparent touch panel of the present invention.

1 . . . Transparent touch panel, 2 . . . film for optical use, 3 . . . transparent conductive film, 4 . . . transparent conductive member, 5 . . . spacer, 6 . . . glass substrate, 7 . . . transparent conductive film, 21 . . . base material layer, 22 . . . undercoat layer, 23 . . . resin layer.

The invention claimed is:

1. A film for optical use comprising a base material layer, and an undercoat layer and resin layer successively laminated on at least one surface of the base material layer, wherein refractive index na of the base material layer, refractive index nb of the undercoat layer and refractive index nc of the resin layer satisfy a relation of $na \leq nb \leq nc$ or $na \geq nb \geq nc$ (provided that $na \neq nc$), and difference of the refractive index of the base material layer and the refractive index of the resin layer is 0.5 or smaller, and wherein wet tension of the undercoat layer is 40 mN/m or higher according to JIS K6768:1999.

2. The film for optical use according to claim 1, wherein difference of refractive indexes of adjacent layers is 0.2 or smaller.

3. The film for optical use according to claim 1, wherein haze of the film is 5% or lower according to JIS K7105:1981.

4. The film for optical use according to claim 1, wherein the resin layer is a hard coat layer.

5. The film for optical use according to claim 1, wherein the refractive indexes of the base material layer, the undercoat layer and the resin layer are in the relation of $na \geq nb \geq nc$ (provided that $na \neq nc$), the refractive index of the base material layer is 1.45 or larger and 1.75 or smaller, the refractive index of the undercoat layer is 1.40 or larger and 1.70 or smaller, and the refractive index of the resin layer is 1.35 or larger and 1.65 or smaller.

6. A transparent conductive member comprising the film for optical use according claim 1 and a transparent conductive film disposed on at least one surface of the film for optical use.

7. A transparent touch panel comprising two transparent electrode substrates each provided with a transparent conductive film on at least one surface thereof and disposed so that the transparent conductive films face each other, wherein the transparent conductive member according to claim 6 is used as at least one of the transparent electrode substrates.

8. A transparent touch panel comprising two transparent electrode substrates each provided with a transparent conductive film on at least one surface thereof and disposed so that the transparent conductive films face each, wherein one of the two transparent electrode substrates is a movable electrode substrate, the other is a fixed electrode substrate, and the transparent conductive member according to claim 6 is used as the movable electrode substrate.

9. The film for optical use according to claim 1 wherein interference unevenness in the film, generated in the reflected light of a three-band lamp, was completely inconspicuous.

* * * * *